US012262170B2

(12) United States Patent
Hui et al.

(10) Patent No.: US 12,262,170 B2
(45) Date of Patent: Mar. 25, 2025

(54) SPEAKER MODULE

(71) Applicant: AAC Technologies Pte. Ltd., Singapore (SG)

(72) Inventors: Yao Hui, Shenzhen (CN); Yufen Chu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 17/921,099

(22) PCT Filed: Aug. 10, 2022

(86) PCT No.: PCT/CN2022/111351
§ 371 (c)(1),
(2) Date: Oct. 24, 2022

(87) PCT Pub. No.: WO2024/016403
PCT Pub. Date: Jan. 25, 2024

(65) Prior Publication Data

US 2024/0223937 A1 Jul. 4, 2024

(30) Foreign Application Priority Data

Jul. 19, 2022 (CN) ......................... 202210850132.8

(51) Int. Cl.
*H04R 1/28* (2006.01)

(52) U.S. Cl.
CPC ...................................... *H04R 1/28* (2013.01)

(58) Field of Classification Search
CPC .............................. H04R 1/28; H04R 2499/11
See application file for complete search history.

(56) References Cited

U.S. PATENT DOCUMENTS

2016/0127822 A1* 5/2016 Zhang .................... H04R 1/288 381/346
2021/0112342 A1* 4/2021 Xu ........................ G06F 1/1626
2021/0235185 A1* 7/2021 Qin ........................ H04R 9/022

FOREIGN PATENT DOCUMENTS

CN 102868957 A * 1/2013 ............... H04R 1/30
CN 104902407 A * 9/2015
CN 109997373 A * 7/2019 ........... G06F 1/1656
CN 210016497 U * 2/2020
CN 216700234 U * 6/2022
JP 2023129248 A * 9/2023 ............. H04R 1/023
WO WO-2021218554 A1 * 11/2021 ............. H04R 1/021

OTHER PUBLICATIONS

English translation of CN 216700234 U, accessed Sep. 12, 2024 via Espacenet.com <https://translationportal.epo.org/emtp/translate/?ACTION=description-retrieval&COUNTRY=CN&ENGINE=google&FORMAT=docdb&KIND=U&LOCALE=en_EP&NUMBER=216700234&SRCLANG=zh&TRGLANG=en> (Year: 2022).*

* cited by examiner

*Primary Examiner* — Jeremy A Luks
(74) *Attorney, Agent, or Firm* — W&G Law Group

(57) ABSTRACT

The invention provides a speaker module for a mobile terminal provided with a sound output port. The speaker module includes a speaker box, and the speaker box includes a sound output opening. The speaker module also includes a horn barrel connected with the sound output opening. The sound output opening includes a first sound output opening and a second sound output opening. Compared with the related art, the present invention can realize multi-level resonance, small size, convenient to widen the frequency band range and easy to adapt to the mobile terminal.

7 Claims, 8 Drawing Sheets

100

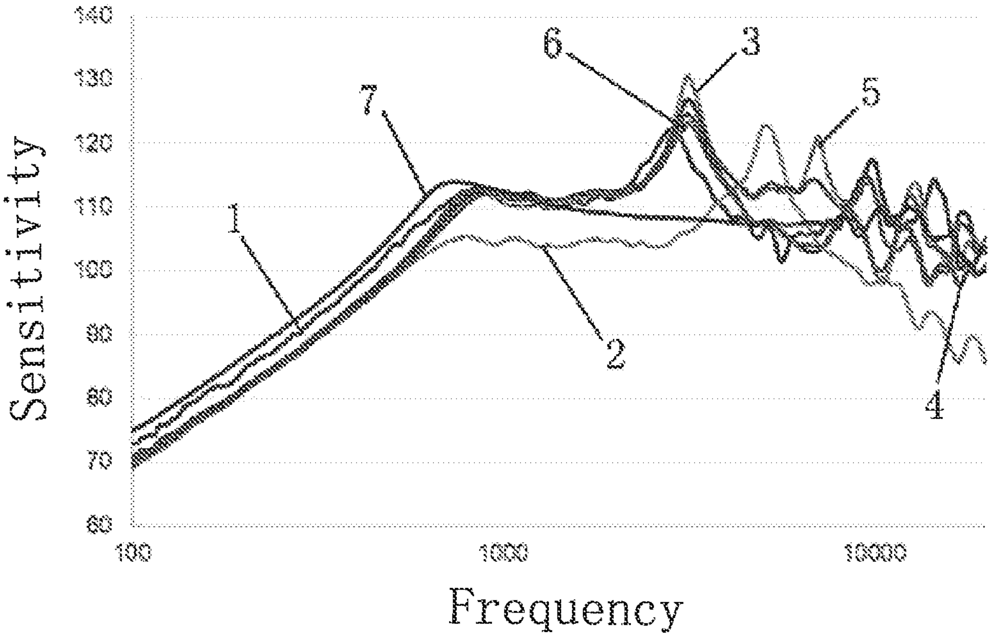

1- multi-level horn plus sound port matching module
2- normal side-sounding module MicSPL (dB)
3- initial version level 2 horn MicSPL (dB)
4- initial version level 2 horn plus sound absorbing MicSPL (dB)
5- multi-level horn with variable sectional surface MicSPL (dB)
6- multi-level horn with variable sectional surface plus sound-absorbing material MicSPL (dB)
7- large back cavity module front sounding

Fig. 8

SPEAKER MODULE

FIELD OF THE PRESENT DISCLOSURE

The present invention relates to the field of electro-acoustic transducers, and in particular relates to a speaker module.

DESCRIPTION OF RELATED ART

With the development of electro-acoustic conversion technology, it has been used in terminal electronic devices such as computers, mobile phones, MP4, and PDA. With the continuous progress and development of the electronics industry and science and technology, the audience will inevitably put forward higher requirements for the acoustic performance of the speaker, so the speaker module is widely used in various terminal equipment.

The upper top surface and the lower bottom surface of the speaker's horn barrel in the related art are both planes in the thickness direction of the terminal device. upper top surface is parallel to the upper housing surface of the terminal device, and the lower bottom surface is parallel to the lower housing surface of the terminal device. The horn barrel has an extension from the horn barrel mouth to the horn barrel throat in the thickness direction perpendicular to the terminal equipment and the length direction of the horn barrel. Therefore, under the premise that the thickness of the terminal equipment is relatively thin, the speaker box and the horn barrel are combined to achieve the purpose of low resonance frequency $f_0$ and high loudness.

However, the horn barrel of the related art is bulky, has a high requirement for shape expansion, and has poor chassis adaptation and poor resonance effect.

Therefore, it is necessary to provide a new speaker module to solve the above problems.

SUMMARY OF THE PRESENT INVENTION

The technical problem to be solved by the present invention is to provide a speaker module with small size, good chassis adaptation effect, good multi-level harmonic effect and effectively widening the frequency band range.

The present invention provides a speaker module having a sound output opening which is arranged on the side surface of the speaker box, and the horn barrel is connected with the sound output opening. The horn barrel has a hollow structure. sound output opening includes a first sound output opening arranged in the direction of the horizontal axis of the speaker box and a second sound output opening arranged in the direction of the longitudinal axis of the speaker box. The horn barrel includes a first section connected to the first sound output opening, a second section and a third section bent and extended from an end of the first section away from the first sound output opening.

One end of the second section away from the first section is used to connect to the sound output port. Two ends of the third section are respectively connected to the second sound output opening and the second section. The horn barrel is set into three parts, so that the symmetrical horn barrel from horizontal axis direction of the speaker to the sound output opening produces multi-level resonance and widens the frequency band range.

In this way, the horn barrel from the sound output side of the speaker's vertical axis to the third section of the sound output opening of the device compensates the symmetrical horn barrel response curve. Eliminate the drop in the high frequency response caused by the chassis hole, and further improve the high frequency performance. At the same time, it is small in size and high in space utilization, which is easy to adapt to the chassis of different terminal equipment.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 8 is a SPL curve of an acoustic performance test result of the speaker module of the present invention.

DETAILED DESCRIPTION OF THE EXEMPLARY EMBODIMENT

Figure 1:
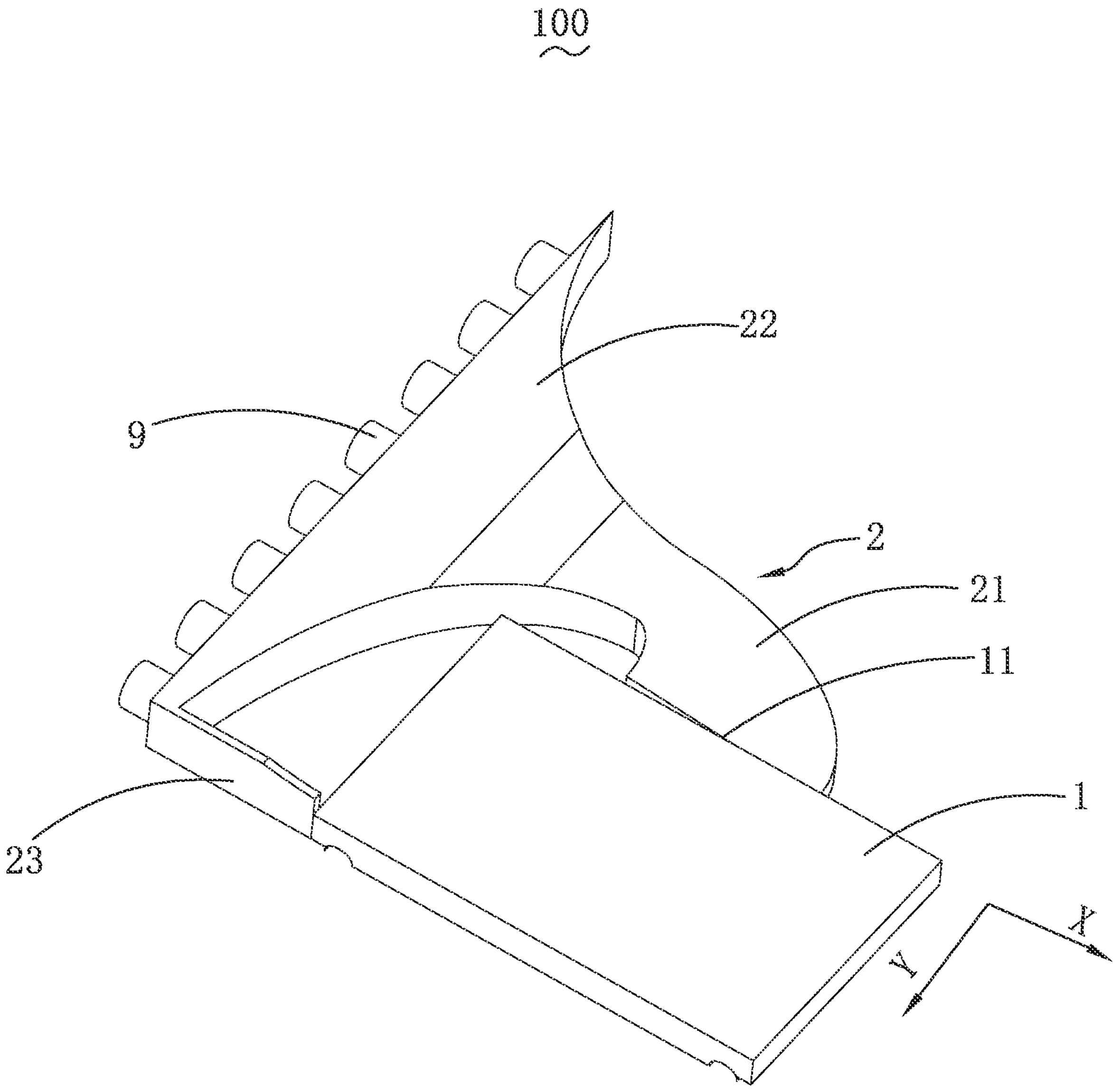
FIG. 1 is an isometric view of a speaker module in accordance with an exemplary embodiment of the present invention.
Figure 2:
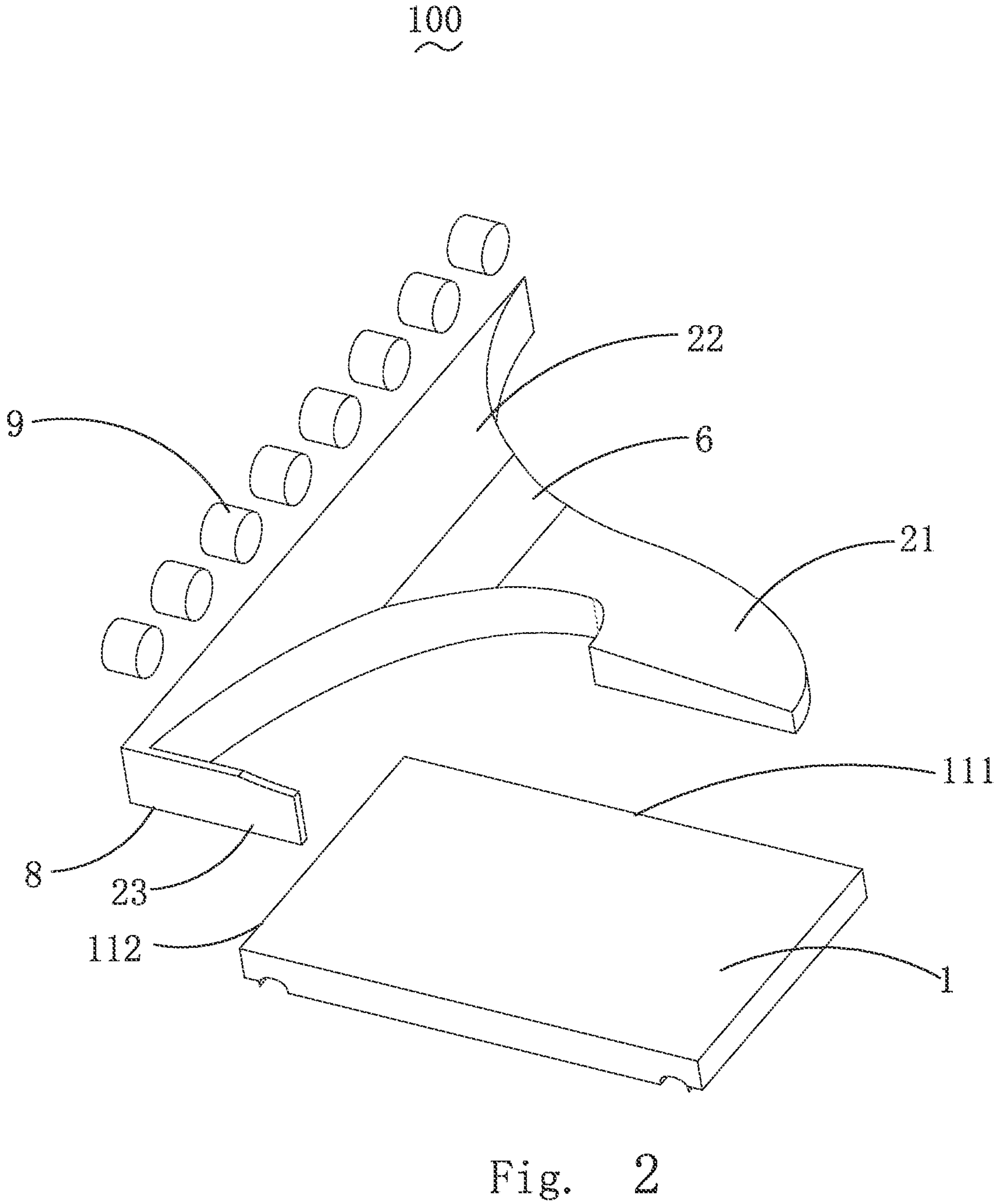
FIG. 2 is an exploded view of the speaker module in FIG. 1.
Figure 3:
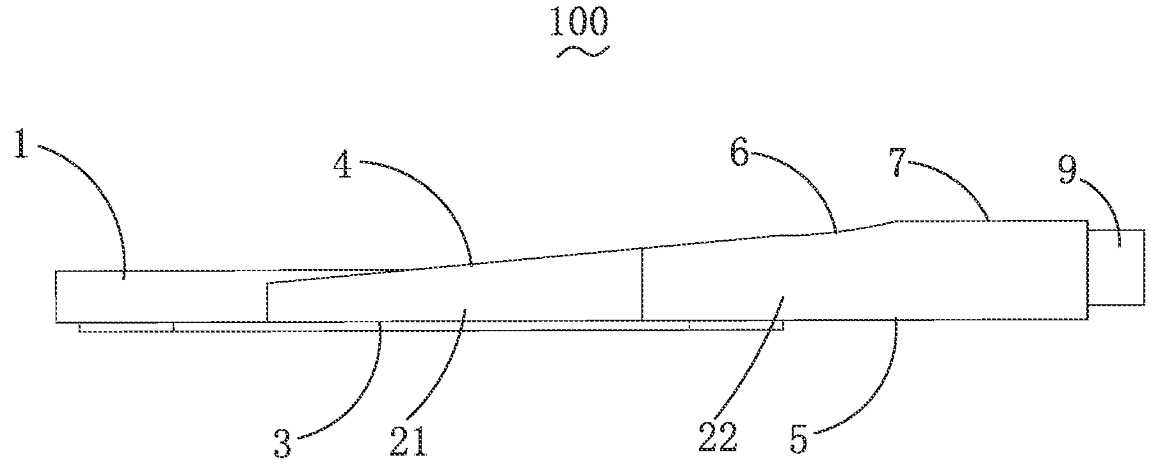
FIG. 3 is a right-side view of the speaker module of the present invention.
Figure 4:
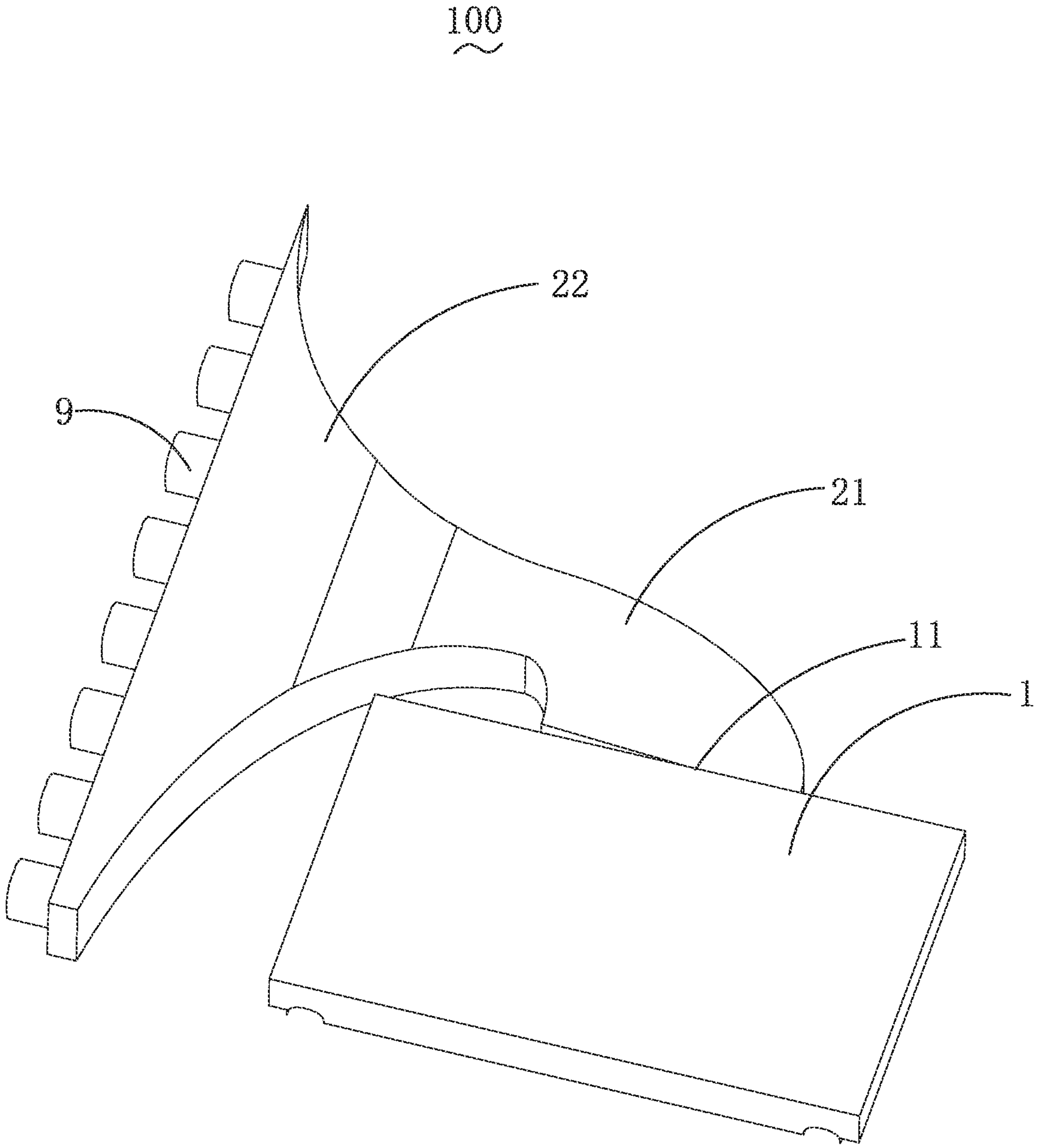
FIG. 4 is a schematic view of the speaker module of the present invention without a third section.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Please refer to FIGS. 1-4, a speaker module 100 is provided for a mobile terminal with sound output port 9. The speaker module 100 includes a speaker box 1. The speaker box 1 includes a sound output opening 11 for the side surface to generate sound. The speaker module 100 further includes a horn barrel 2 connected to the sound output opening 11. The horn barrel 2 has a hollow structure. The sound output opening 11 includes a first sound output opening 111 arranged at intervals along the horizontal axis of the speaker box 1 and a second sound output opening 112 arranged along the vertical axis of the speaker box 1. The horn barrel 2 includes a first section 21 connected with the first sound output opening 111, a second section 22 and a third section 23 bent and extended from an end of the first section 21 away from the first sound output opening 111. The second section 22 away from the first section 21 is used to connect to the sound output port 9. The third section 23 are connected to the second sound output opening 112 and the second section 22, respectively.

Wherein, the sound output port 9 includes multiple and evenly distributed settings side by side, the sound output effect is uniform, and the acoustic performance is good.

Specifically, the speaker box 1 is used to generate sound, and the sound output opening 11 is used to transmit the sound of the speaker box 1. The sound output opening 11 is connected to the horn barrel 2. The horn barrel 2 has a hollow structure and is used to transmit the sound from the speaker box 1 to the sound output port 9 of the mobile terminal. The sound is transmitted through the sound output port 9, thereby improving the acoustic performance of the speaker module 100.

Specifically, the sound output opening 11 includes a first sound output opening 111 and a second sound output opening 112 arranged in the horizontal axis direction of the speaker box 1 at intervals. By arranging the first sound output opening 111 and the second sound output opening 112 on the side surface of the speaker box 1, it is used to realize the sound output. Optionally, the side surface may be the same side, an adjacent side, or a corresponding side, or the like. When the symmetrical horn barrel 2 from the sounding side of the speaker's long axis to the sound output opening 11 produces multi-level resonance and broadens the frequency band range, the third horn barrel 2 from the sound output side of the speaker box 1 short axis (y axis) to the sound output opening 11 of the device compensates the response curve of symmetrical horn barrel 12 to further improve the high frequency performance. Optionally, long axis is horizontal axis, short axis is vertical axis.

Wherein, the first sound output opening 111 is connected with the first section 21. The second sound output opening 112 is connected with the third section 23. The third section 23 are connected to the second sound output opening 112 and the second section 22, respectively. The outer opening of the second section 22 is set corresponding to the sound output port 9, which is convenient for sound transmission. At the same time, the speaker module 100 has a small overall size and high space utilization, which is easy to adapt to the chassis of different mobile terminals, and the adaptation effect is good. There is no need to fill the attenuation material, and the cost is low.

In this embodiment, the speaker box 1 is rectangular. The first sound output opening 111 is located on one of the long axis sides of the speaker box 1. The second sound output opening 112 is located on one of the short axis sides of the speaker box 1. The second section 22 is bent from the first section 21 to extend beyond the speaker box 1 and is provided with a plane where the short axis side of the second sound output opening 112 is located. In this way, the symmetrical horn barrel from the long axis direction of the speaker to the sound output opening produces multi-level resonance, which broadens the frequency band range.

In this embodiment, when the horn barrel 2 only includes a first section 21 and a second section 22, the sound output opening 11 is set on a side surface of the speaker box 1. The first section 21 to the second section 22 in turn through the sound output opening 11, and the second section 22 outputs the outside of the chassis through the sound output port 9, so that the acoustic performance of the mobile terminal is good.

In this embodiment, the cross-sectional area of the first section 21 gradually decreases along its sound output direction; the cross-sectional area of the second section 22 gradually increases along its sound output direction. The cross-sectional area of the third section 23 is unchanged along its sound output direction.

The thin wall thicknesses of the first section 21 and the second section 22 are the same. When the thickness of the first section 21 increases along the sound output direction approaching the second section 22, the horn barrel 2 is expanded, which can achieve multi-level resonance, improve high-frequency radiation capability, and widen the frequency band range.

In this embodiment, the bottom surface of the first section 21 is the first plane 3. The top surface of the first section 21 is the inclined surface 4. The bottom surface of the second section 22 is the second plane 5. The top surface of the second section 22 includes an arc-shaped surface 6 and a third plane 7 connected to the arc-shaped surface 6. The bottom surface and the top surface of the third section 23 are the fourth plane 8. Wherein, the first plane 3 and the second plane 5 are the same plane. By setting the bottom surface of first section 21, second section 22, and third section 23 to plane, it is convenient to install in mobile terminal, with wide contact surface and high stability.

Since the top surface of the first section 21 is the inclined surface 4. The top surface of the second section 22 includes an arc-shaped surface 6 and a third plane 7 connected to the arc-shaped surface 6. The sectional surface of each part of the horn barrel 2 is different, so that the impedance of each part of the horn barrel 2 is fully coupled. In this way, a small volume of multi-level resonance is achieved and the effect of broadening the frequency band range is achieved.

In this embodiment, the second section 22 has an axisymmetric structure along the center line of its sound output direction. The axisymmetric structure makes the sound transmission of the second section 22 evenly distributed to the sound output port 9, and the acoustic performance is good.

In this embodiment, the second section 22 is trumpet-shaped. The horn shape is convenient to improve the high frequency radiation capability and widen the frequency band range.

Figure 6:
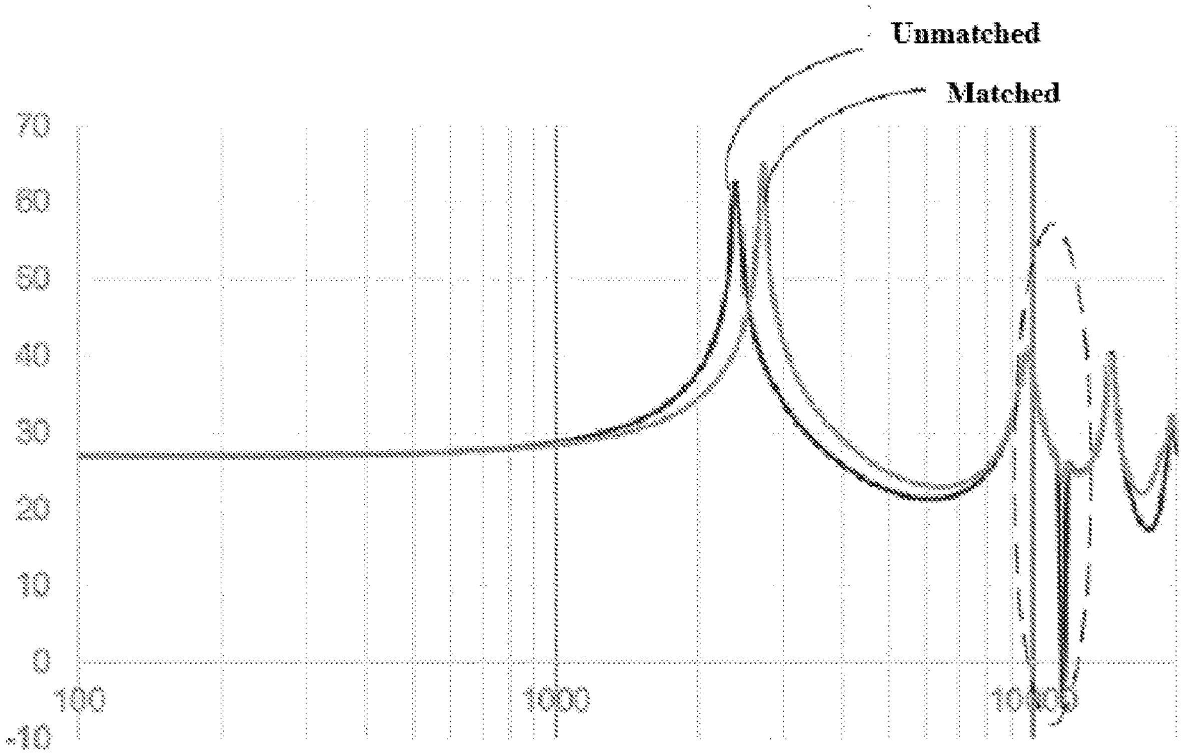
FIG. 6 is a matching SPL curve of the speaker module of the present invention.

Specifically, after adding the chassis hole of the mobile terminal, the frequency response curve of the symmetrical horn barrel 2 produces a very deep valley value at 11.5 khz. As shown in FIG. 6, a sound pressure node appears in the speaker's long axis direction at this frequency, resulting in a pit valley in the sound output. The sound output port is added in the short axis direction, the sound pressure intensity on both sides of the long axis is changed, the valley value is increased by 11.5 khz, and the acoustic performance is good.

Figure 5:
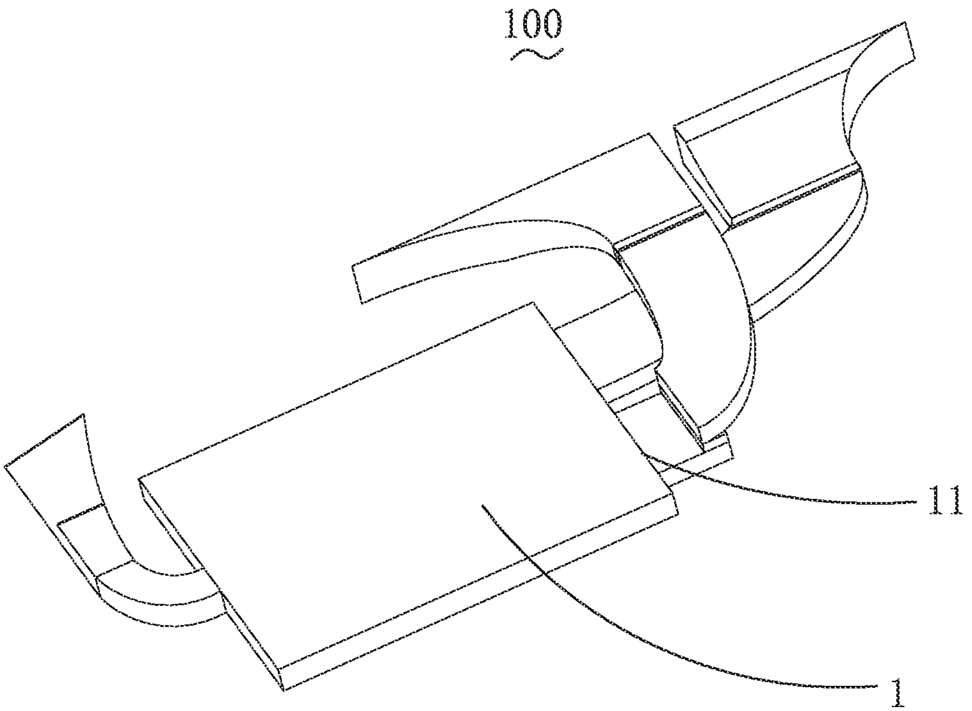
FIG. 5 is a schematic view of the speaker module with multiple overlapped horn barrels mounted.

In this embodiment, as shown in FIG. 5, the horn barrel 2 includes multiple. The first sections 21 of the horn barrels 2 are arranged side by side along the long axis direction of the speaker box 1. The second sections 22 of the plurality of the horn barrels 2 are arranged alternately and stacked along the thickness direction of the speaker box 1. The third sections 23 of the horn barrels 2 are arranged side by side along the short axis direction of the speaker box 1. Optionally, the multiple horn barrels 2 are 2, 3, 4, etc., which are selected according to actual needs.

Specifically, using the speaker to divide the horn barrel 2 into multiple layers, the width of the single-layer horn barrel 2 is controlled to be smaller than the half wavelength. The cutoff frequency of the horn barrel 2 is increased to achieve smooth sound transmission and improve high frequency performance. By changing the sectional surfaces of the first section 21 and the second section 22 of the two horn barrels 2 gradually, the resonance peaks of each horn barrel 2 are coupled to improve the high frequency performance. At the same time, the volume and space requirements can be reduced, the lengths of the two first section 21 and the second section 22 can be extended, and the number of resonance frequencies can be increased. Multi-level resonance is controlled by multiple horn barrel 2 parts to achieve high frequency boost effect of multiple frequencies.

Preferably, when there are three horn barrels 2, the three horn barrels 2 are arranged side by side or cross each other. It is also possible that two horn barrels 2 are placed side by side, and one horn barrel 2 overlaps with one of the two horn barrels 2 or is arranged between the two horn barrels 2. Multi-level resonance is controlled by multiple horn barrel 2 parts to achieve high frequency boost effect of multiple frequencies.

In this embodiment, the second section 22 and/or the third section 23 are filled with sound absorbing material. Increase the damping of the horn barrel 2 by filling the sound absorbing material, compensate the symmetrical horn barrel 2 response curve, and improve the high frequency performance.

Figure 7:
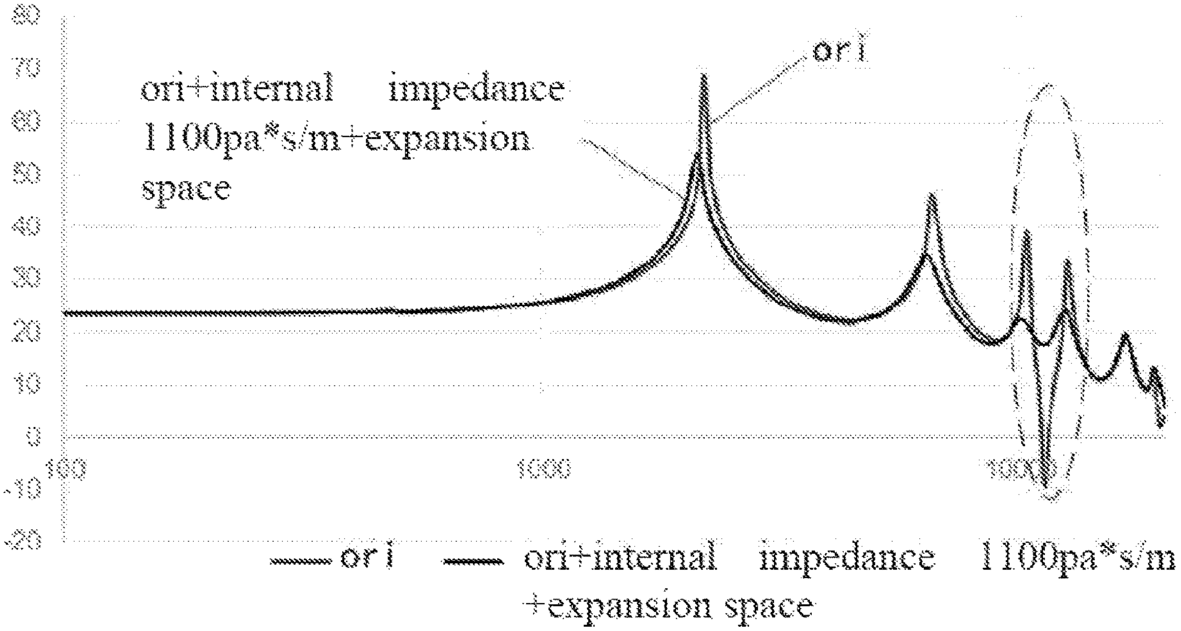
FIG. 7 shows a sound pressure level SPL curve when the speaker module of the present invention is filled with attenuation material.

Specifically, as shown in FIG. 7, the SPL curve of on is compared with the SPL curve of ori+ internal impedance 1100 pa*s/m+ expansion space in the figure. The symmetrical horn barrel from the long axis direction of the speaker to the sound output opening produces multi-level resonance, which broadens the frequency band range. Use a small chamber to fill the attenuation material to increase the pipe damping and smooth the high frequency SPL curve. By increasing the local volume and changing the acoustic capacitor, the resonant frequency point can be controlled.

In this embodiment, as shown in FIG. 8, the sensitivity of conventional side-emitting module 2 at the same frequency is lower than that of the multi-level horn plus sound port matching module 1, the horn 3 of the initial version level 2, the horn of the initial version level 2 plus sound absorbing material 4, the multi-level horn with variable sectional surface 5, the multi-level horn with variable sectional surface plus sound-absorbing material 6, and the large rear cavity module 7 which is sounding. Therefore, it can be seen from the above test results that, compared with the sounding module of conventional side 2, various solutions with a horn barrel have a higher frequency band. Wherein, the bandwidth and frequency response floating of multi-level horn matching plus sound output hole matching model 1 are higher than other schemes.

Compared with the related art, in the speaker module of the present invention, a sound output opening is arranged on the side surface of the speaker box, and the horn barrel is connected with the sound output opening. The horn barrel has a hollow structure. The sound output opening includes a first sound output opening and a second sound output opening which are arranged at intervals on the side surface of the speaker box. The horn barrel includes a first section connected to the first sound output opening, a second section and a third section bent and extended from an end of the first section away from the first sound output opening. One end of the second section away from the first section is used to connect to the sound output port. Two ends of the third section are respectively connected to the second sound output opening and the second section. By setting the horn barrel into three parts, the symmetrical horn barrel from the long axis direction of the speaker to the sound output opening produces multi-level resonance and broadens the frequency band range. The horn barrel from the sounding side of the short axis direction of the speaker to the third section of the sound output opening of the device compensates for the response curve of the symmetrical horn barrel, further improving high frequency performance. At the same time, it is small in size and high in space utilization, which is easy to adapt to the chassis of different terminal equipment.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker module for a mobile terminal provided with a sound output port, including:

a speaker box having a sound output opening in a side surface to generate sound, the sound output opening having a first sound output opening arranged in a direction of a horizontal axis of the speaker box and a second sound output opening arranged in a direction of the longitudinal axis of the speaker box;

a horn barrel connected to the sound output opening, the horn barrel having a hollow structure and used to transmit a sound from the speaker box to the sound output port of the mobile terminal, the horn barrel including a first section connected to the first sound output opening, a second section bent and extended from ends of the first section away from the first sound output opening, and a third section bent and extended from the second section; wherein one end of the second section away from the first section connects to the sound output port; and two ends of the third section are respectively connected to the second sound output opening and the second section.

2. The speaker module as described in claim 1, wherein, the first sound output opening is located on one of the long axis sides of the speaker box; the second sound output opening is located on one of the short axis sides of the speaker box; and the second section is bent from the first section and extends beyond the plane of the speaker box where the short axis side of the second sound output opening is located.

3. The speaker module as described in claim 2, wherein, a cross-sectional area of the first section gradually decreases along the sound output direction; a cross-sectional area of the second section gradually increases along the sound output direction; a cross-sectional area of the third section remains unchanged along the sound output direction.

4. The speaker module as described in claim 3, wherein, a bottom surface of the first section is a first plane, a top surface of the first section is an inclined plane, and a bottom surface of the second section is a second plane; a top surface of the second section includes an arc-shaped surface and a third plane connected to the arc-shaped surface; the bottom surface and top surface of the third section are the fourth plane; the first plane and the second plane are the same plane.

5. The speaker module as described in claim 3, wherein, the second section has an axisymmetric structure along the center line of its sound output direction.

6. The speaker module as described in claim 3, wherein the second section is in a shape of a horn.

7. The speaker module as described in claim 1, wherein the second section and/or the third section is filled with sound absorbing material.

* * * * *